(12) United States Patent
Tajan et al.

(10) Patent No.: US 9,938,000 B2
(45) Date of Patent: Apr. 10, 2018

(54) AIR PROPELLER BLADE PIVOT IN THE SHAPE OF A SPHERICAL CAP

(71) Applicant: SNECMA, Paris (FR)

(72) Inventors: Sebastien Tajan, Sucy en Brie (FR); Adrien Jacques Philippe Fabre, Montrouge (FR); Christophe Jacquemard, Hericy (FR); Adrien Laurenceau, Melun (FR)

(73) Assignee: SNECMA, Paris (FR)

( * ) Notice: Subject to any disclaimer, the term of this patent is extended or adjusted under 35 U.S.C. 154(b) by 221 days.

(21) Appl. No.: 14/899,010

(22) PCT Filed: Jun. 12, 2014

(86) PCT No.: PCT/FR2014/051441
§ 371 (c)(1),
(2) Date: Dec. 16, 2015

(87) PCT Pub. No.: WO2014/202873
PCT Pub. Date: Dec. 24, 2014

(65) Prior Publication Data
US 2016/0121999 A1    May 5, 2016

(30) Foreign Application Priority Data
Jun. 17, 2013  (FR) ...................................... 13 55627

(51) Int. Cl.
*B64C 11/30*     (2006.01)
*B64C 11/34*     (2006.01)
(Continued)

(52) U.S. Cl.
CPC ............ *B64C 11/346* (2013.01); *B64C 11/06* (2013.01); *F04D 29/323* (2013.01);
(Continued)

(58) Field of Classification Search
CPC .............................. B64C 11/04; B64C 11/346
See application file for complete search history.

(56) References Cited

U.S. PATENT DOCUMENTS 2,844,303 A  7/1958  Kristiansen
4,863,352 A  9/1989  Hauser et al.
(Continued)

FOREIGN PATENT DOCUMENTS

FR    2 105 914 A5   4/1972
FR    2 572 769 A1   5/1986
FR    2 957 329 A1   9/2011

OTHER PUBLICATIONS

International Search Report dated Aug. 28, 2014 for PCT/FR2014/051441 filed on Jun. 12, 2014.

*Primary Examiner* — Logan Kraft
*Assistant Examiner* — Jason Fountain
(74) *Attorney, Agent, or Firm* — Oblon, McClelland, Maier & Neustadt, L.L.P.

(57) ABSTRACT

A pivot for an air propeller blade, the pivot including a rotary support for mounting radially on a propeller hub while being suitable for pivoting about a pivot axis; and a blade support including a housing for receiving a blade root and at least one arm extending laterally relative to the pivot axis and carrying a flyweight forming a counterweight; the arm and its flyweight presenting the general geometrical shape of a spherical cap.

10 Claims, 4 Drawing Sheets

(51) Int. Cl.
*F04D 29/32* (2006.01)
*F04D 29/36* (2006.01)
*B64C 11/06* (2006.01)
*B64D 27/00* (2006.01)

(52) U.S. Cl.
CPC ...... *F04D 29/366* (2013.01); *B64D 2027/005* (2013.01); *Y02T 50/66* (2013.01)

(56) References Cited

U.S. PATENT DOCUMENTS

| | | | | |
|---|---|---|---|---|
| 9,227,723 | B2* | 1/2016 | Balk | B64C 11/306 |
| 9,453,414 | B2* | 9/2016 | Tajan | B64C 11/06 |
| 9,458,730 | B2* | 10/2016 | Carvalho | B64C 11/385 |
| 9,527,579 | B2* | 12/2016 | Carvalho | B64C 11/346 |
| 9,598,967 | B2* | 3/2017 | Xu | F01D 5/30 |
| 2010/0003139 | A1* | 1/2010 | Loos | B64C 11/306 |
| | | | | 416/147 |
| 2013/0011259 | A1* | 1/2013 | Balk | B64C 11/306 |
| | | | | 416/128 |
| 2014/0099206 | A1* | 4/2014 | Tajan | F01D 5/081 |
| | | | | 416/95 |
| 2014/0212292 | A1* | 7/2014 | Xu | F01D 5/30 |
| | | | | 416/193 A |
| 2014/0341739 | A1* | 11/2014 | Tajan | B64C 11/346 |
| | | | | 416/147 |
| 2016/0017728 | A1* | 1/2016 | Fabre | F01D 7/00 |
| | | | | 416/135 |

* cited by examiner

AIR PROPELLER BLADE PIVOT IN THE SHAPE OF A SPHERICAL CAP

BACKGROUND OF THE INVENTION

The present invention relates to the general field of air propellers. It relates more particularly to a propeller blade pivot.

An air propeller is used in particular in the field of aviation for propelling an aircraft. It is to be found in particular in an aircraft turboprop having a single propeller or two contrarotating propellers.

Typically, each of the propellers of an aircraft turboprop is made up of a plurality of unducted fan blades. The fan blades are of variable pitch, i.e. each blade can pivot about its longitudinal axis (its pitch axis) in order to adapt the orientation of its leading edge to engine speed. The orientation of fan blades (also referred to as the pitch setting) thus constitutes one of the parameters that enable the thrust of the turboprop to be managed.

For this purpose, each propeller blade is generally mounted via its root on a pivot that comprises a rotary support arranged radially in an orifice in a propeller hub while being capable of pivoting in the orifice about a longitudinal axis of the blade.

Each blade pivot also has a blade support that is provided with a socket that is to receive a blade root and also with at least one arm extending laterally relative to the pivot axis of the pivot and carrying a flyweight that forms a counterweight. In the event of an engine failure, the centrifugal force acting on the flyweight positioned on the pivot arm thus serves to ensure that the blade is automatically feathered and that it is held in its feathered orientation.

The main functions of the pivot of a propeller blade are thus to hold the blade (against aerodynamic and centrifugal forces), to hold the flyweights for feathering the blade (essentially against centrifugal force), and to provide the blade with guidance in orientation (mainly against inertial forces).

Blade pivots are generally made of metal, in particular of steel or of titanium. Unfortunately, a large number of blades, in particular in a turboprop having two contrarotating propellers, increases the number of pivots and thus increases the on-board weight.

There thus exists a need to have available a shape for a blade pivot that makes it possible to achieve a saving in weight, in particular given the forces exerted by centrifugal force on the counterweight-forming flyweights.

OBJECT AND SUMMARY OF THE INVENTION

This object is achieved by a pivot for an air propeller blade, the pivot comprising: a rotary support for placing radially on a propeller hub while being suitable for pivoting about a pivot axis; and a blade support including a housing for receiving a blade root and at least one arm extending laterally relative to the pivot axis and carrying a flyweight forming a counterweight; and wherein, in accordance with the invention, the arm and its flyweight present the general geometrical shape of a spherical cap.

The centrifugal force that acts on the arm of the blade pivot tends to cause it to bend. Having the arm and its flyweight with the general shape of a spherical cap makes it possible to increase its structural efficiency by providing a better distribution of the traction and compression stresses that are induced by the arm bending. This makes it possible to lighten the weight of the blade pivot.

Furthermore, the vaulted shape of the blade support makes it easier to integrate the blade pivot in its nacelle (which may present a shape that is cylindrical or a shape with double curvature). In particular, by means of such a shape, the radial size of the blade pivot can be reduced.

Preferably, the arm and its flyweight have a section that is curved in a longitudinal plane and a section that is curved in a transverse plane. Under such circumstances, each of the curved sections may present a respective radius of curvature lying in the range 200 millimeters (mm) to 400 mm for a turboprop propeller blade, and lying in the range 700 mm to 900 mm for a propeller blade of a turboprop having two contrarotating propellers.

Also preferably, at least the blade support is made of organic matrix composite material. Making the main portion of the propeller pivot out of composite material makes it possible to achieve a significant reduction in weight of the order of 30% to 50% relative to a prior art propeller pivot made of metal.

The blade support may comprise two opposite arms extending laterally relative to the pivot axis and each carrying a flyweight forming a counterweight.

In an embodiment, the blade support arm is connected to the housing via a portion of curved profile. In this example, the path between the arm and the central region of the pivot having the recess is continuous, thereby further improving the distribution of the traction and compression stresses induced by the arms bending. In particular, when the blade support has two opposite arms, they are connected to the housing and they also extend upstream and downstream therefrom. Thus, if composite material is used for making the blade support, the section of the composite material is maximized in a region where the stresses induced by the bending of the arms are large.

In another embodiment, the blade support arm is connected to the housing via a portion of rectilinear profile. Compared with the preceding embodiment, such a connection by means of a portion of rectilinear profile makes it possible to achieve a substantial saving in weight.

The blade support housing may be a socket oriented in a direction that is substantially perpendicular to the arm.

The invention also provides an air propeller comprising a plurality of blades, each mounted in a pivot as defined above. The invention also provides an aircraft turboprop including at least one such propeller.

BRIEF DESCRIPTION OF THE DRAWINGS

Other characteristics and advantages of the present invention appear from the following description made with reference to the accompanying drawings, which show embodiments having no limiting character. In the figures.

MORE DETAILED DESCRIPTION

Figure 1:
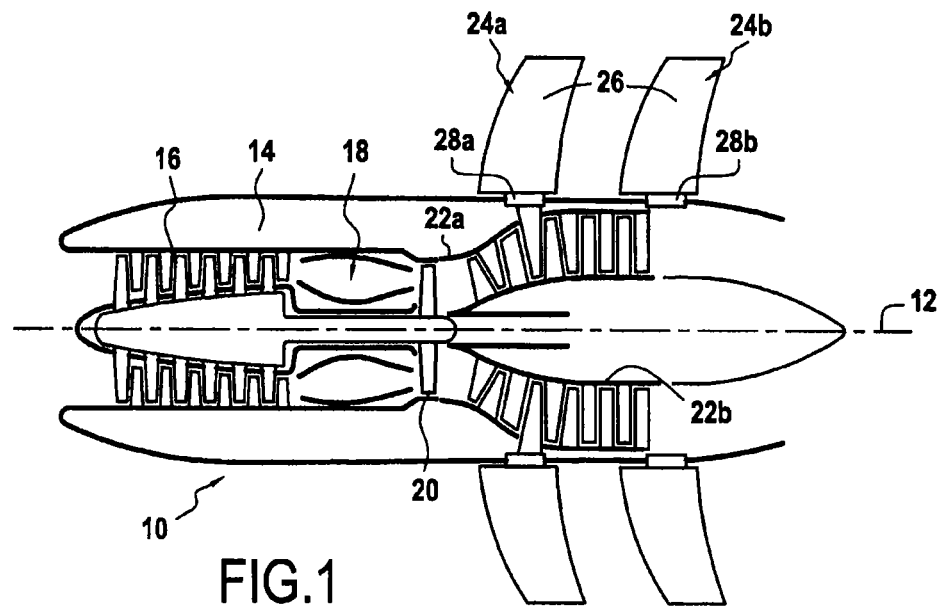
FIG. 1 is a diagrammatic view in longitudinal half-section of a turboprop having two unducted propellers to which the invention applies in particular.

The invention applies to any aircraft turboprop having at least one propeller with variable pitch blades, and in particular it applies to airplane turboprops having two unducted contrarotating propellers, such as the turboprop shown in FIG. 1.

Such a turboprop 10 is known and is therefore not described in detail. Typically, it comprises a longitudinal axis 12 and an annular nacelle 14 arranged coaxially about the longitudinal axis. The turboprop 10 also comprises, from upstream to downstream: a compressor 16; a combustion chamber 18; and a turbine 20 having two contrarotating rotors 22a and 22b, these various elements also being arranged coaxially around the longitudinal axis 12 of the turboprop.

The turboprop 10 also has an upstream (or front) propeller 24a and a downstream (or rear) propeller 24b having fan blades 26 of adjustable pitch. More precisely, the fan blades 26 of each propeller 24a, 24b are mounted on respective rotary rings 28a, 28b centered on the longitudinal axis 12 of the turboprop. Each rotor 22a, 22b of the turbine 20 carries and drives in rotation a respective one of the rotary rings 28a, 28b having one of the propellers 24a, 24b mounted thereon. Alternatively, the propellers 24a, 24b could be driven in rotation by a single rotor of the turbine via stepdown gearing.

The fan blades 26 of the two propellers 24a, 24b are of adjustable pitch, i.e. each of them can pivot about its longitudinal axis in order to adapt the orientation of its leading edge to the engine speed and/or to pilot controls.

Figure 2:
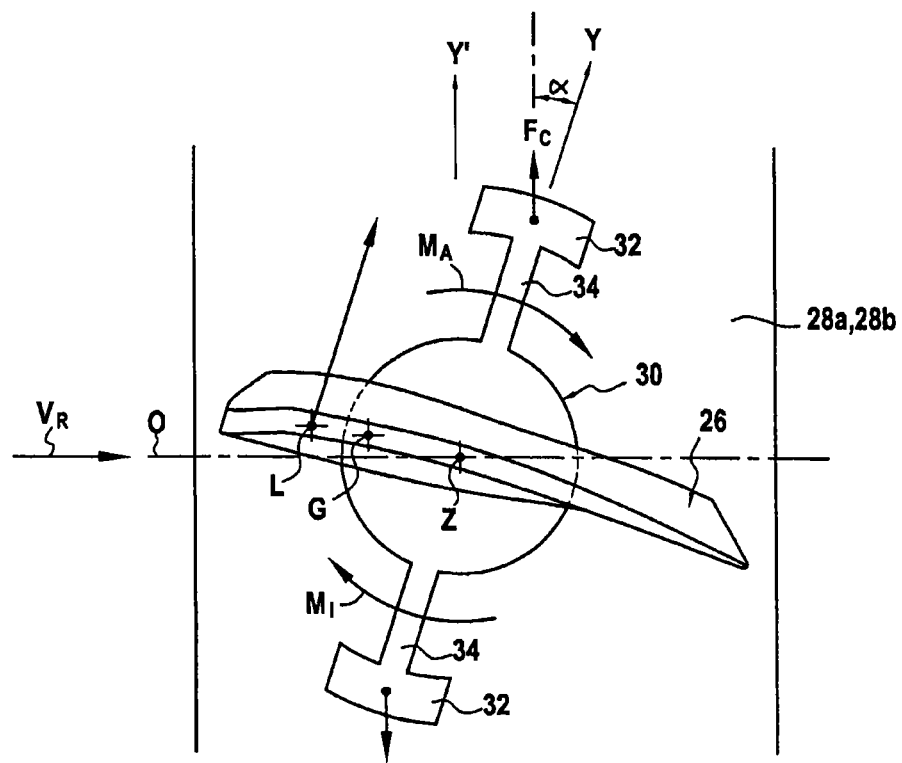
FIG. 2 is a diagrammatic view showing the operation of a propeller blade pivot.

For this purpose, and as shown in FIG. 2, each fan blade 26 is mounted on a pivot 30 that is to be mounted radially on the corresponding rotary ring 28a, 28b while being suitable for pivoting in this orifice about a pivot axis Z of the pivot. Pivoting of the pivot 30 relative to the rotary ring 28a, 20b thus causes a change in the orientation of the leading edge of the corresponding fan blade. This pivoting is obtained by conventional actuator devices of hydraulic or electrical type.

In the event of an engine failure, it is advantageous for each fan blade 26 to be capable of being feathered automatically, i.e. so as to have an angle of attack relative to the relative wind $V_R$ that is substantially zero. Furthermore, passive means are provided to keep the fan blades 26 feathered, even in the event of a failure of the actuator devices for pivoting the pivots 30. Specifically, the center of thrust L of each blade may be offset relative to the pivot axis Z of the pivot 30, thereby generating aerodynamic torque $M_A$ tending to cause the blade to pivot. In addition, inertia torque $M_i$ is also generated, as a result of the center of gravity G being offset relative to the pivot axis Z.

In order to counter these torques $M_A$ and $M_i$, and in order to keep the blade feathered, counterweight-forming flyweights 32 are typically mounted at the free ends of arms 34 that extend laterally relative to the pivot axis Z. These arms are oriented substantially perpendicularly to the pressure and suction sides of the blade 30 (angle α lying in the range ±30° relative to a plane normal to the socket of the pivot receiving the blade root), in such a manner that when the propeller is rotating about its axis of rotation O, the centrifugal forces $F_C$ acting on the flyweights 32 tend to bring the main direction Y of the arms 34 into alignment with a tangential direction Y' of the propeller, thereby countering the aerodynamic and inertia torques $M_A$ and $M_i$ and bringing the blade back into alignment with the direction of the relative wind $V_R$.

Figure 3:
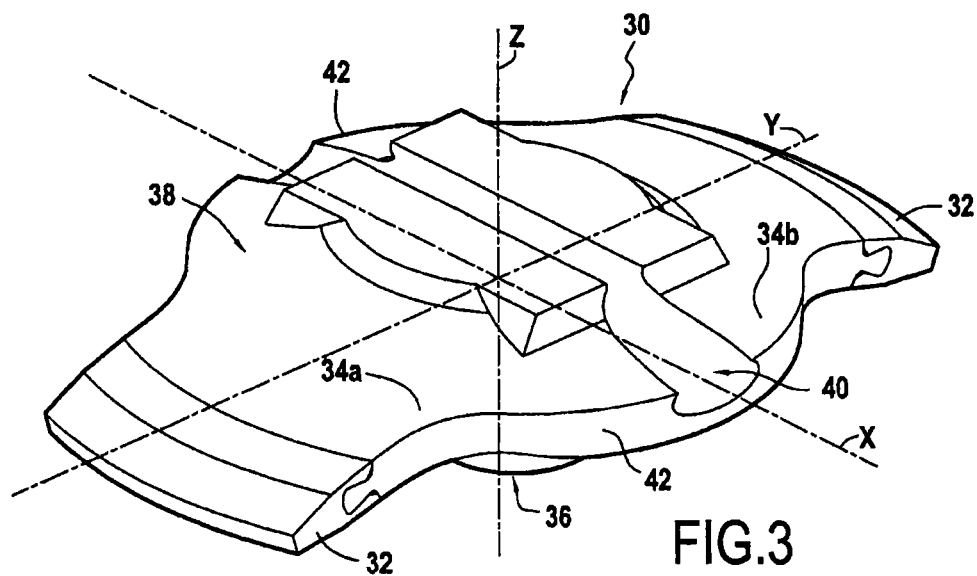
FIGS. 3 and 4 are perspective views of a propeller blade pivot in a first embodiment of the invention, seen respectively from above and from below.
Figure 4:
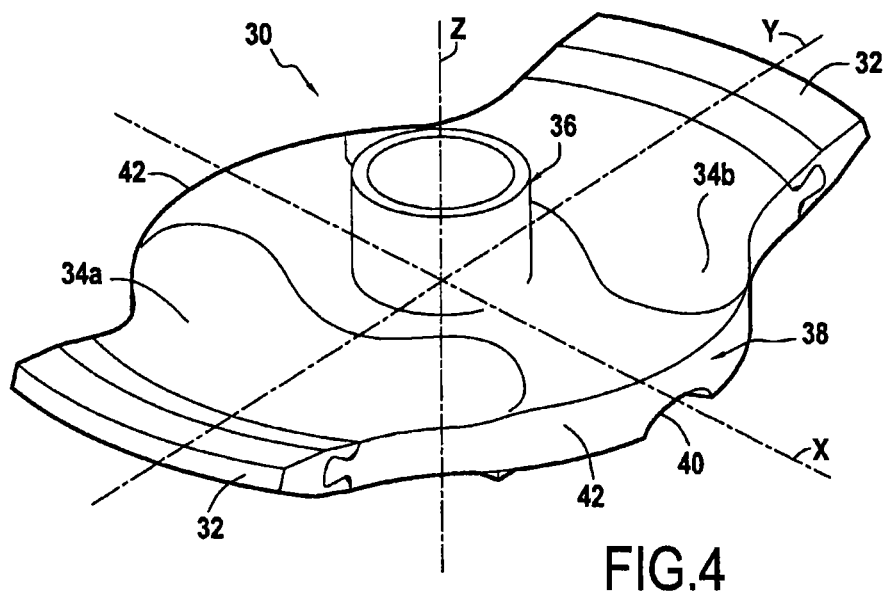

FIGS. 3 and 4 are perspective views of a propeller blade pivot 30 in a first embodiment of the invention.

In this embodiment, the propeller blade pivot 30 comprises a rotary support 36 and a blade support 38. The rotary support 36 is in the form of a hollow cylinder centered on the pivot axis Z of the pivot. This rotary support 36 is for mounting radially on the respective rotary ring of the turboprop, while being capable of pivoting about the pivot axis Z.

The blade support 38 comprises in particular a housing, e.g. a socket 40 in the form of a slot, that is for receiving a blade root, together with two opposite arms 34 (namely a pressure side arm 34a and a suction side arm 34b) extending laterally relative to the pivot axis Z from the socket.

In the examples shown in the figures, the housing for the blade root is in the form of a slot. Naturally, it is possible to envisage other types of housing as a function of the selected application, and in particular a cylindrical housing when the blade root is cylindrical in shape.

The arms 34 extend in a direction Y that is perpendicular to the pivot axis Z, and the socket 40 extends in a direction X that is perpendicular to the pivot axis Z and to the direction Y of the arms 34a, 34b. Furthermore, each arm carries a counterweight-forming flyweight 32 at its free end.

In the invention, each arm 34a, 34b together with its flyweight 32 present the general geometrical shape of a spherical cap.

The term "shape of a spherical cap" is used herein to mean that each arm and the flyweight that it carries present the shape of a portion of a sphere that has been truncated by a plane (other than a midplane).

In other words, the arm and its flyweight present the shape of an inwardly-facing vault (i.e. facing towards the rotary support 36), with double curvature.

Figure 5:
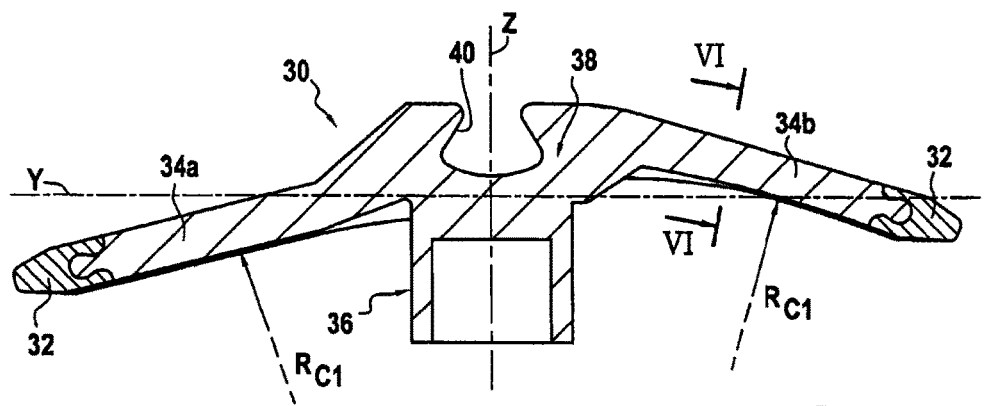
FIG. 5 is a longitudinal section view of the pivot of FIGS. 3 and 4.

Thus, and as shown in FIG. 5, which is a longitudinal section view of the pivot 30 (i.e. a view in a plane defined by the pivot axis Z and the direction Y of the arms 34), each arm 34a, 34b and its flyweight 32 presents a section that is curved with a first radius of curvature $R_{c1}$.

Figure 6:
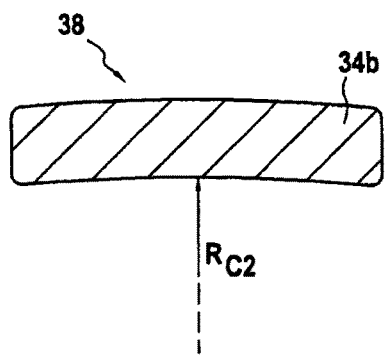
FIG. 6 is a cross-section view of the pivot of FIGS. 3 and 4.

Likewise, FIG. 6 shows the propeller blade pivot of the first embodiment in a cross-section view, i.e. a view in a plane defined by the pivot axis Z and the direction X of the socket 40 (FIG. 6 is also a section view on plane VI-VI of FIG. 5).

In this cross section plane, the suction side arm 34b and its flyweight 32 likewise present a section that is curved with a second radius of curvature $R_{c2}$. Although not shown in the figures, the pressure side arm 32b and its flyweight also present a section that is curved in this cross section plane.

For a pivot in which the distance between the centers of gravity of the flyweights 32 and the pivot axis Z lies in the range 100 mm to 300 mm, the radii of curvature $R_{c1}$ and $R_{c2}$ lie in the range 200 mm to 400 mm (for a turboprop propeller blade) and in the range 700 mm to 900 mm (for a propeller blade of a turboprop having two contrarotating propellers).

It should be observed that when the pivot presents two arms provided with flyweights, the difference between the radial distances of the centers of gravity of the two flyweights relative to the pivot axis Z should be minimized.

Furthermore, still with the presence of two arms, the radial positions of the flyweights should preferably be different in order to avoid any conflict during rotation of the pivots relative to one another. In other words, the radii of curvature $R_{c1}$ are different for the pressure side arm 34a and for the suction side arm 34b of any given pivot.

In the first embodiment, the two arms 34a and 34b of the blade support 36 are connected to the socket 40 by portions 42 of curved profile.

The paths between the arms 34a, 34b and the central region of the pivot provided with the socket 40 are thus continuous, thereby better distributing the traction and compression stresses that are induced by the arms bending. In particular, the arms are connected to the socket and they also extend upstream and downstream therefrom, while conserving their double curvature (in the planes X-Z and Y-Z).

As a result, if a composite material is used for making the blade support, the section of the composite material is maximized in the region where the stresses induced by bending of the arms are large.

It should be observed that the arms could be elements that are added to the blade support, e.g. using assembly means of the bolting type or involving co-operation between male and female shapes.

Figure 7:
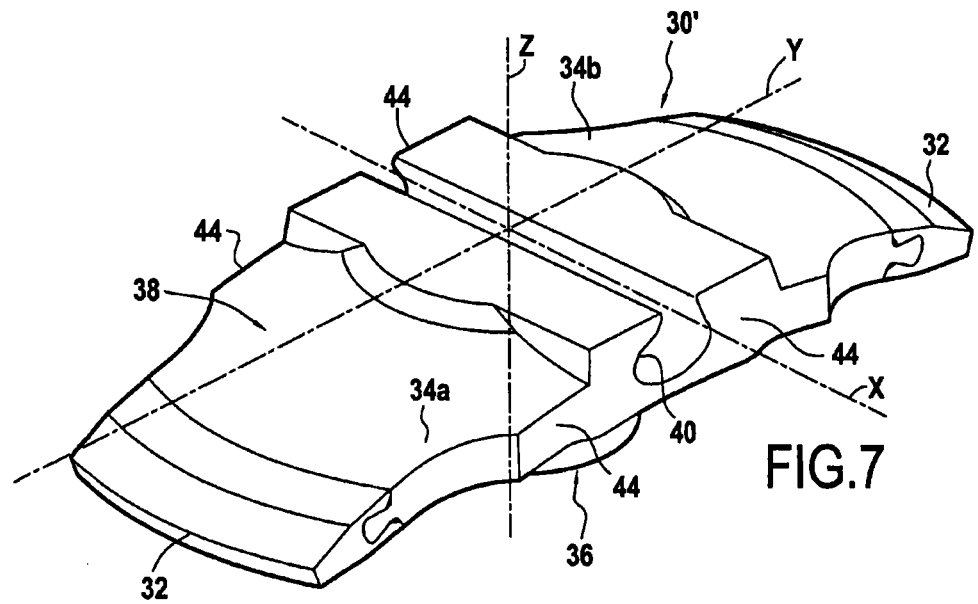
FIGS. 7 and 8 are perspective views of a propeller blade pivot in a second embodiment of the invention, seen respectively from above and from below.
Figure 8:
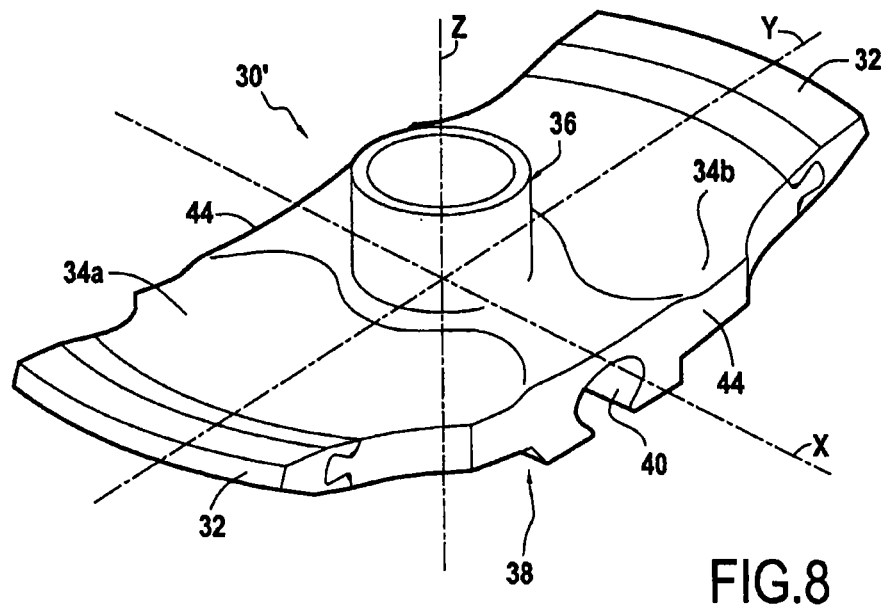

FIGS. 7 and 8 are perspective views of a propeller blade pivot 30' in a second embodiment of the invention.

The pivot 30' differs from the above-described pivot in that the two arms 34a and 34b of the blade support 38 are connected to the socket 40 by portions 44 of rectilinear profile. In other words, the central region of the pivot having the socket 40 is truncated in comparison with the central region shown in FIGS. 5 and 6. Thus, compared with the above-described embodiment, the blade pivot 30' is of reduced weight.

Figure 9:
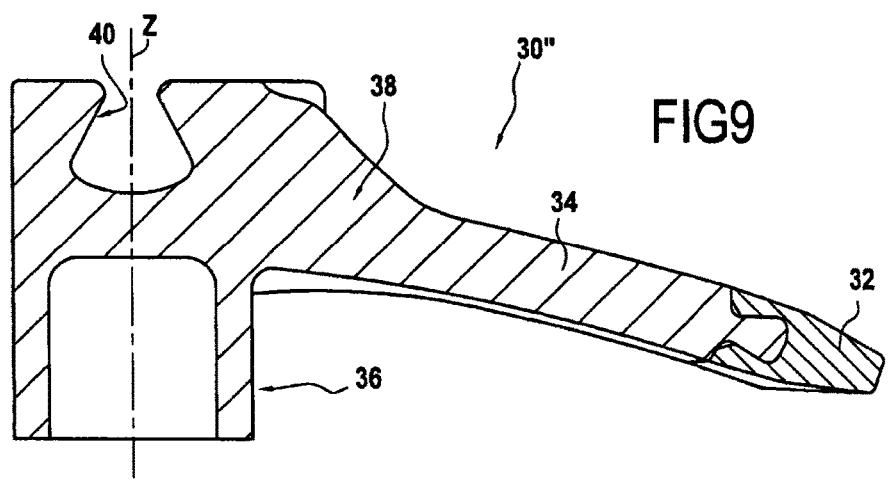
FIG. 9 is a longitudinal section view of a propeller blade pivot in a third embodiment of the invention.

FIG. 9 is a longitudinal section view of a propeller blade pivot 30" in a third embodiment of the invention. In this embodiment, the blade support 38 has only one arm 34. The other characteristics are identical to those described with reference to either of the two above-described embodiments. In particular, the arm 34 and its flyweight 32 in this embodiment likewise present the general geometrical shape of a spherical cap.

In an advantageous provision that is common to all of the described embodiments, at least the blade support (and possibly also the rotary support) is made of an organic matrix composite material.

Typically, the organic matrix composite material that is used comprises fibers embedded in an organic matrix, and more specifically a polymeric matrix. The fibers may in particular be carbon fibers, glass fibers, polyamide fibers, or polyethylene fibers, etc. These fibers may be arranged in layers that are unidirectional, woven in two or three dimensions, and/or braided. They are embedded in an organic matrix, more specifically a polymeric matrix, which may be formed in particular by a thermosetting resin such as an epoxy resin, or by other thermosetting resins that are better adapted to high temperatures.

Reference may be made to the French patent applications numbers 13/54427 and 13/54428 filed by the applicant on May 17, 2013, the content of which is incorporated herein by reference. Those patent applications describe various embodiments of a propeller blade pivot made at least in part out of an organic matrix composite material.

The invention claimed is:

1. A pivot for an air propeller blade, the pivot comprising:
a rotary support for mounting radially on a propeller hub while being suitable for pivoting about a pivot axis; and
a blade support including a housing for receiving a blade root and an arm extending laterally relative to the pivot axis and carrying a flyweight forming a counterweight,
wherein the arm and the flyweight present the general geometrical shape of a spherical cap facing the rotary support with a double curvature, the arm and the flyweight having a first section that is curved in a longitudinal plane defined by the pivot axis and a direction in which the arm extends, and having a second section that is curved in a transverse plane defined by the pivot axis and a direction in which the housing extends.

2. The pivot according to claim 1, wherein the arm and its flyweight have a section that is curved in a longitudinal plane and a section that is curved in a transverse plane.

3. The pivot according to claim 1, wherein each of the first and second sections presents a respective radius of curvature lying in the range 200 mm to 400 mm for a propeller blade of a turboprop having a single propeller, and lying in the range 700 mm to 900 mm for a propeller blade of a turboprop having two contrarotating propellers.

4. The pivot according to claim 1, wherein at least the blade support is made of organic matrix composite material.

5. The pivot according to claim 1, wherein the blade support comprises two opposite arms extending laterally relative to the pivot axis and each carrying a flyweight forming a counterweight.

6. The pivot according to claim 1, wherein the blade support arm is connected to the housing via a portion of curved profile.

7. The pivot according to claim 1, wherein the blade support arm is connected to the housing via a portion of rectilinear profile.

8. The pivot according to claim 1, wherein the blade support housing is a socket oriented in a direction that is substantially perpendicular to the arm.

9. An air propeller comprising a plurality of blades, each mounted in a pivot according to claim 1.

10. An aircraft turboprop including at least one propeller according to claim 9.

* * * * *